US010762160B2

(12) United States Patent
Yanagihara et al.

(10) Patent No.: US 10,762,160 B2
(45) Date of Patent: *Sep. 1, 2020

(54) DELIVERING CONTENT TO ELECTRONIC DEVICES USING LOCAL CACHING SERVERS

(71) Applicant: Apple Inc., Cupertino, CA (US)

(72) Inventors: Kazuhisa Yanagihara, Cupertino, CA (US); Lionel Gentil, Dublin, CA (US); Darrin B. Jewell, Woodside, CA (US); Jason R. Thorpe, San Francisco, CA (US); Jordan L. Redner, Redwood City, CA (US); Gregory B. Vaughan, Santa Cruz, CA (US); Gregory Burns, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/146,782

(22) Filed: Sep. 28, 2018

(65) Prior Publication Data

US 2019/0034551 A1 Jan. 31, 2019

Related U.S. Application Data

(60) Division of application No. 13/631,551, filed on Sep. 28, 2012, now Pat. No. 10,095,803, which is a
(Continued)

(51) Int. Cl.
*H04L 29/08* (2006.01)
*G06F 15/16* (2006.01)
(Continued)

(52) U.S. Cl.
CPC ...... *G06F 16/9574* (2019.01); *H04L 67/2842* (2013.01); *H04L 61/2514* (2013.01)

(58) Field of Classification Search
CPC .......... G06F 17/30902; G06F 16/9574; H04L 67/2842
See application file for complete search history.

(56) References Cited

U.S. PATENT DOCUMENTS 8,447,876 B2 * 5/2013 Verma ................. H04L 67/2861
709/232
8,560,496 B2 * 10/2013 Flick ....................... G06F 16/24
707/613

(Continued)

OTHER PUBLICATIONS

"CDNsim: A Simulation Tool for Content Distribution Networks"—Konstantinos et al, Department of Informatics, Aristotle University of Thessaloniki, Department of Computer Science, University of Cyprus & Department of Computer & Communication Engineering, University of Thessaly Nov. 2008 (Year: 2008).*

*Primary Examiner* — Randy A Scott
(74) *Attorney, Agent, or Firm* — Fletcher Yoder PC

(57) ABSTRACT

The disclosed embodiments provide a system that delivers content to an electronic device, The system includes a content provider that obtains a public address of the electronic device from a first request for the content from the electronic device, Next, the content provider uses the public address to identify a local caching server on a local area network (LAN) of the electronic device. Finally, the content provider provides a local address of the local caching server to the electronic device, wherein the local address is used by the electronic device to obtain the content from the local caching server and the LAN without accessing a content delivery network (CDN) outside the LAN.

17 Claims, 6 Drawing Sheets

Related U.S. Application Data continuation-in-part of application No. 13/563,433, filed on Jul. 31, 2012, now Pat. No. 10,154,109.

(51) Int. Cl.
   *G06F 16/957*    (2019.01)
   *H04L 29/12*     (2006.01)

(56) References Cited

U.S. PATENT DOCUMENTS

| | | | |
|---|---|---|---|
| 9,495,338 B1* | 11/2016 | Hollis | G06F 17/2247 |
| 2011/0153719 A1* | 6/2011 | Santoro | H04L 43/08 |
| | | | 709/203 |
| 2011/0153722 A1* | 6/2011 | Choudhary | H04L 67/2814 |
| | | | 709/203 |
| 2014/0019578 A1* | 1/2014 | Lim | H04L 61/1511 |
| | | | 709/213 |

* cited by examiner

DELIVERING CONTENT TO ELECTRONIC DEVICES USING LOCAL CACHING SERVERS

RELATED APPLICATION

This application is a divisional of U.S. patent application Ser. No. 13/631,551, filed on Sep. 28, 2012, which is a continuation-in-part of, and hereby claims priority under 35 U.S.C. § 120 to, pending U.S. patent application Ser. No. 13/563,433, titled "Delivering Content to Electronic Devices using Local Caching Servers," by the same inventors, which was filed on 31 Jul. 2012, and which is hereby incorporated by reference.

BACKGROUND

Field

The disclosed embodiments relate to content delivery. More specifically, the disclosed embodiments relate to techniques for delivering content to electronic devices using local caching servers in the same local area networks (LANs) as the electronic devices.

Related Art

Recent improvements in computing power and wireless networking technology have significantly increased the capabilities of electronic devices. For example, laptop computers, tablet computers, portable media players, smart phones, digital media receivers, video game consoles, and/or other modern computing devices are typically equipped with WiFi capabilities that allow the computing devices to retrieve web pages, stream audio and/or video, share desktops and/or user interfaces (UIs), and/or transfer files wirelessly among one another.

Such increases in the capabilities and numbers of electronic devices have also expanded software distribution and digital content delivery to the electronic devices. For example, users of the electronic devices may frequently download music, movies, pictures, books, software updates, and/or applications from Internet-based content providers and/or content delivery networks onto the electronic devices.

On the other hand, bandwidth consumed by software distribution and digital content delivery may interfere with Internet usage and/or access from the electronic devices. For example, a digital textbook may be more than one gigabyte in size and take hours or days to download using a slower Internet connection at a school. In turn, downloading of the textbook onto thousands of electronic devices, each of which is assigned to one of thousands of students at the school, may take over a thousand hours to complete. Similarly, such downloading activity may consume a majority of available bandwidth on the Internet connection and slow web browsing and/or other Internet usage for users sharing the same Internet connection. Finally, the transmission of gigabytes or terabytes of data to the electronic devices may exceed an Internet Service Provider's (ISP's) bandwidth cap for the Internet connection, causing further slowdowns and/or increased charges for Internet access for the school. Consequently, delivery of content to large numbers of electronic devices using the same Internet connection may negatively impact the deployment and/or usage of the electronic devices.

SUMMARY

The disclosed embodiments provide a system that delivers content to an electronic device. The system includes a content provider that obtains a public address of the electronic device from a first request for the content from the electronic device. Next, the content provider uses the public address and a global server list to identify a local caching server on a local area network (LAN) of the electronic device. Finally, the content provider provides a local address of the local caching server to the electronic device, wherein the local address is used by the electronic device to obtain the content from the local caching server and the LAN without accessing a content delivery network (CDN) outside the LAN.

In some embodiments, the system also includes the local caching server. First, the local caching server obtains a second request for the content from the electronic device. lithe content is available on the local caching server, the local caching server provides the content to the electronic device through the LAN. If the content is not available on the local caching server, the local caching server downloads the content from the CDN, caches the downloaded content, and provides the downloaded content to the electronic device through the LAN.

In some embodiments, the content provider also provides the C to the electronic device, wherein the CDN is used by the electronic device to obtain the content upon detecting an error associated with obtaining the content from the local caching server.

In some embodiments, the error is associated with at least one of an unavailability of the local caching server, a corruption of the content, and an unsupported network topology between the electronic device and the local caching server.

In some embodiments, the local caching server also verifies the downloaded content. Upon receiving a notification of corruption of the downloaded content from the electronic device, the local caching server expedites verification of the downloaded content. Upon verifying corruption of the downloaded content, the local caching server flushes the content from the local caching server.

In some embodiments, verifying the downloaded content at the local caching server includes calculating a first checksum from a block of the downloaded content, and comparing the first checksum with a second checksum for the block from the CDN, In some embodiments, a registration server also registers the local caching server. In some embodiments, registering the local caching server includes: obtaining registration information for the local caching server and, upon verifying the registration information, adding the local caching server to the global server list of local caching servers.

In some embodiments, verifying the registration information includes obtaining a certificate for the local caching server from the registration information, and validating the certificate.

In some embodiments, the registration information includes at least one of the certificate, a public address of the local caching server, a local address of the local caching server, and a globally unique identifier (GUID) for the local caching server.

In some embodiments, the content includes at least one of audio, video, an image, a book, a font, "voices," a language dictionary, an application, and a software update.

BRIEF DESCRIPTION OF THE FIGURES

In the figures, like reference numerals refer to the same figure elements.

DETAILED DESCRIPTION

Figure 1:
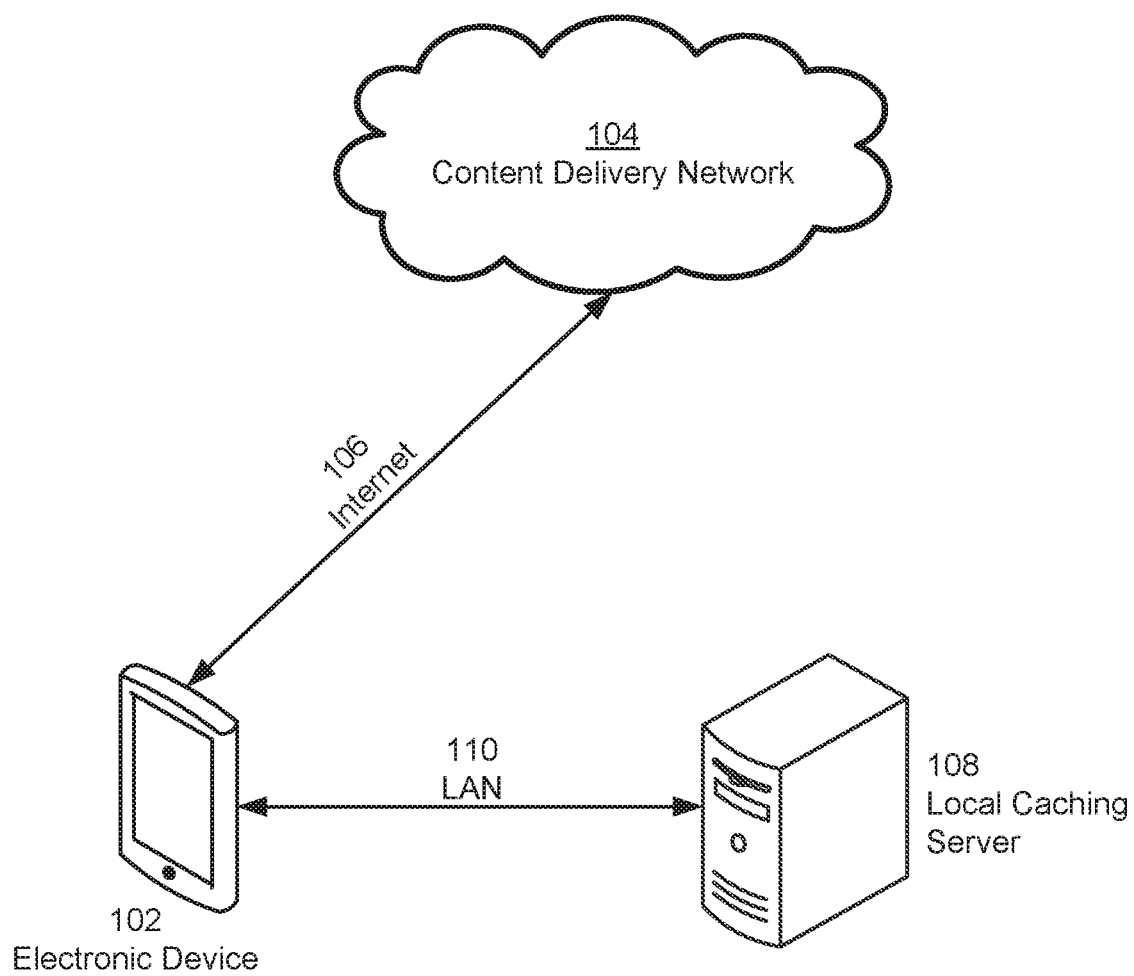
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include non-statutory computer-readable storage mediums such as transmission signals.

The methods and processes described in this detailed description can be included in hardware modules. For example, the hardware modules can include, but are not limited to, processing subsystems, microprocessors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When an electronic device with computing capabilities reads and executes the code and/or data stored on the computer-readable storage medium, the electronic device performs the methods and processes embodied as data structures and code and stored within the computer-readable storage medium. For example, in some embodiments, a processing subsystem can read the code and/or data from a memory subsystem that comprises a computer-readable storage medium, and can execute code and/or use the data to perform the methods and processes.

In the following description, we refer to "some embodiments." Note that "some embodiments" describes a subset of all of the possible embodiments, but does not always specify the same subset of the embodiments.

The disclosed embodiments provide a method and system for providing content to an electronic device. As shown in FIG. 1, an electronic device 102 may use an Internet 106 connection to download content from a content delivery network (CDN) 104. For example, electronic device 102 may be a desktop computer, laptop computer, tablet computer, portable media player, mobile phone, and/or other network-enabled device. In addition, electronic device 102 may request content such as audio, video, a font, "voices," a language dictionary, an image, a book, an application, and/or a software update from a digital media store, software vendor, software update server, and/or other type of content provider. The content provider may respond to the request with information (e.g., a Uniform Resource Locator (URL)) for CDN 104, and electronic device 102 may use the information to connect to CDN 104 and download the content from CDN 104, However, increased downloading of content from CDN 104 and/or other network nodes on Internet 106 by electronic device 102 and/or other electronic devices sharing a local area network (LAN) 110 with electronic device 102 may negatively impact use of Internet 106 and/or the electronic devices. For example, bandwidth consumed by downloads between the electronic devices and CDN 104 may slow web browsing and/or other types of Internet 106 access by other users and/or electronic devices on LAN 110. The downloads may also exceed a bandwidth cap for an Internet Service Provider (ISP) associated with LAN 110, incurring further slowdowns in accessing Internet 106 and/or additional charges by the ISP.

In one or more embodiments, the system of FIG. 1 includes functionality to provide content to electronic device 102 and/or other electronic devices on LAN 110 using a local caching server 108 on LAN 110. As described in further detail below, local caching server 108 may download content from CDN 104, cache the downloaded content, and subsequently provide the downloaded content to electronic device 102 and/or the other electronic devices through LAN 110. In turn, most or all of the electronic devices on LAN 110 may obtain the content without accessing Internet 106 and/or CDN 104, thus mitigating issues associated with increased bandwidth consumption caused by downloading large amounts of content from CDN 104 and/or other network node on Internet 106.

Figure 2:
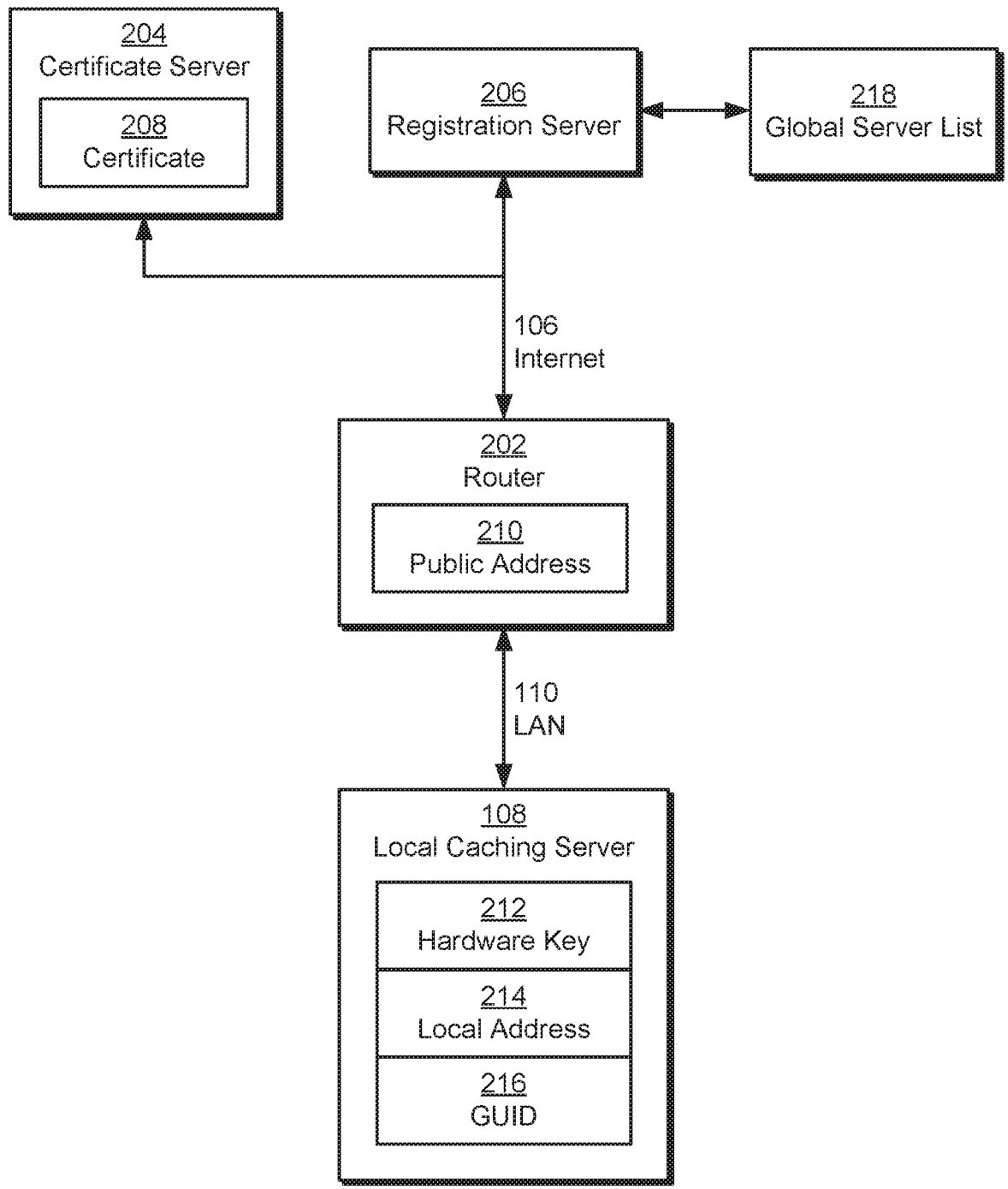
FIG. 2 shows a system for setting up a local caching server in accordance with the disclosed embodiments.

FIG. 2 shows a system for setting up local caching server 108 in accordance with the disclosed embodiments. As mentioned above, local caching server 108 may be connected to a LAN 110 of an electronic device, such as electronic device 102 of FIG. 1. A router 202 may connect the electronic device, local caching server 108, and/or other electronic devices on LAN 110 to Internet 106. In addition, devices on LAN 110, including local caching server 108, may share a public address 210 (e.g., public Internet Protocol (IP) address) with router 202.

In one or more embodiments, local caching server 108 includes functionality to provide content such as video, audio, images, books, fonts, "voices," language dictionaries, applications, and/or software updates to electronic devices connected to LAN 110. To enable use of local caching server 108 by electronic devices on LAN 110, local caching server 108 may be registered with a registration server 206. To enable registration of local caching server 108 with registration server 206, local caching server 108 may provide a hardware key 212. for local caching server 108 to a certificate server 204. If hardware key 212 is valid (e.g., identifies a valid local caching server), certificate 204 may transmit a certificate 208 to local caching server 108.

Next, local caching server 108 and/or a user (e.g., system administrator) may provide registration information containing certificate 208, public address 210, a local address 214 (e.g., local IP address on LAN 110) for local caching server 108, LAN-specific information about local caching server 108 (e.g., a number of local caching servers on LAN 110, a set of addresses served by local caching server 108, etc.), and/or a globally unique identifier (GUID) 216 for local caching server 108 to registration server 206. Registration server 206 may verify the registration information by validating certificate 208. If certificate 208 is not valid, registration server 206 may omit registration of local caching server 108, effectively preventing subsequent use of local caching server 108 in delivering content to electronic devices on LAN 110.

If certificate 208 is valid, registration server 206 may add local caching server 108 to a global server list 218 of local caching servers. For example, registration server 206 may create an entry for local caching server 108 in global server list 218 and add public address 210, local address 214, the LAN-specific information, and GUM 216 from the registration information to the entry. The entry may then be used by content provider 302 to deliver content to electronic devices using local caching server 108 over LAN 110 instead of using CDN 104 to deliver the content over the Internet 106 (and/or the Internet 106 in combination with other networks between CDN 104 and the electronic devices), as discussed in further detail below with respect to FIG. 3.

Finally, local caching server 108 may maintain the registration with registration server 206 by periodically transmitting a communication to registration server 206. For example, local caching server 108 may transmit a "heartbeat" over Internet 106 every hour to registration server 206 to notify registration server 206 that local caching server 108 is available, functioning, and/or connected to Internet 106. Conversely, if registration server 206 does not receive a communication from local caching server 108 after the pre-specified heartbeat interval (e.g., one hour) has passed, registration server 206 may assume that local caching server 108 is down and/or disconnected from Internet 106 and remove local caching server 108 from global server list 218. In some embodiments, the heartbeat interval is communicated from registration server 206 to local caching server 108.

Figure 3:
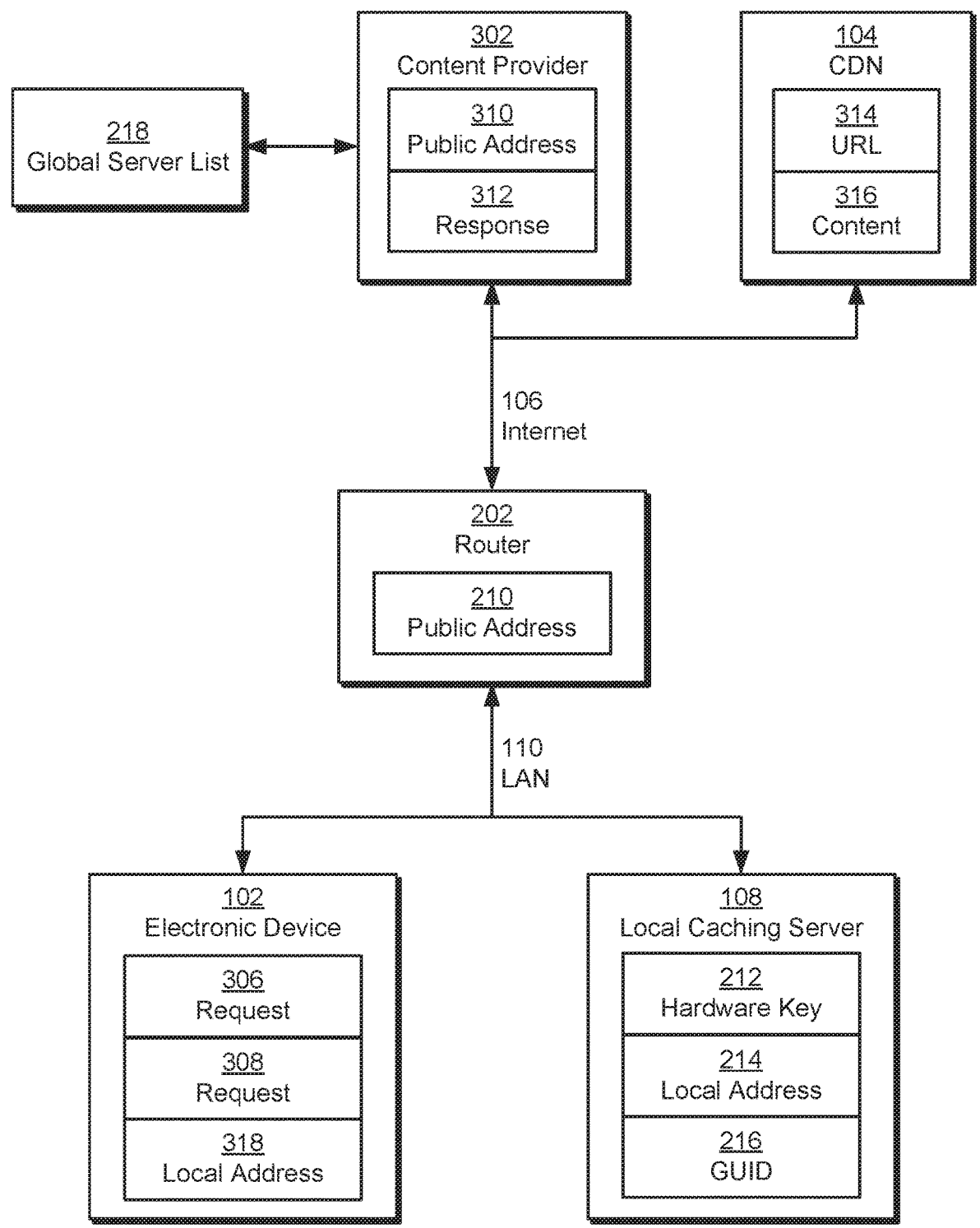
FIG. 3 shows a system for providing content in accordance with the disclosed embodiments.

FIG. 3 shows a system for delivering content 316 to electronic device 102 in accordance with the disclosed embodiments. Electronic device 102 may be connected to LAN 110 and share public address 210 with router 202, which connects LAN 110 to Internet 106. To download content 316 such as audio, video, images, applications, and/or software updates, electronic device 102 may send a first request 306 for content 316 to a content provider 302 on Internet 106, such as a digital media store, software vendor, and/or software update server.

Instead of directing electronic device 102 to CDN 104, where content 316 is hosted, content provider 302 may obtain public address 210 from request 306 and use public address 210 to identify local caching server 108 on LAN 110 of electronic device 102. For example, content provider 302 may match public address 210 to an entry in global server list 218 for local caching server 108. As described above, the entry may be added to global server list 218 during registration of local caching server 108 with a registration server (e.g., registration server 206 of FIG. 2). As described below, using the public address to identify a local caching server can comprise performing one or more operations (mathematical, logical, etc.) to select a particular local caching server in cases where two or more local caching servers are available on the LAN 110.

Content provider 302 may then provide a response 312 to request 306 containing local address 214 of local caching server 108, MID 216, and/or other information that allows electronic device 102 to identify and locate local caching server 108 on LAN 110. In particular, electronic device 102 may use local address 214, GUID 216, and/or another identifier for local caching server 108 from response 312 to send a second request 308 for content 316 to local caching server 108 and obtain content 316 from local caching server 108 and LAN 110 instead of CDN 104 and Internet 106.

As mentioned above, local caching server 108 may cache content 316 and/or other content from CDN 104 to reduce Internet 106 bandwidth consumed by electronic device 102 and/or other electronic devices on LAN 110 during downloads of the content from CDN 104. If the requested content 316 is available (e.g., cached) on local caching server 108, local caching server 108 may provide content 316 to electronic device 102 through LAN 110.

If content 316 is not available on local caching server 108, local caching server 108 may download content 316 from CDN 104, cache the downloaded content 316, and provide the downloaded content 316 to electronic device 102 through LAN 110. For example, local caching server 108 may transmit a block of content 316 to electronic device 102 after downloading the block is downloaded from CDN 104. To secure the caching of content 316 on local caching server 108, local caching server 108 may also encrypt the block prior to writing the block to disk. Once downloading and caching of content 316 are complete, local caching server 108 may handle subsequent requests for content 316 from other electronic devices on LAN 110 by transmitting the cached content 316 to the electronic devices without accessing CDN 104 and/or Internet 106.

Content provider 302 may also use a number of techniques to direct electronic device 102 and/or content from CDN 104 to local caching server 108 and/or other local caching servers with the same public address 210 (e.g., if multiple local caching servers reside on LAN 110). First, content provider 302 may ensure that content 316 and/or other content from CDN 104 is not duplicated among multiple local caching servers on LAN 110 by calculating a unique hash from a uniform resource identifier (URI) of the content (or any other suitable identifying value for the content) and dividing the hash by the number of local caching servers on LAN 110 to obtain a numerical remainder. For example, if a query of global server list 218 returns three different listings for local caching servers on LAN 110 (meaning that there are three local caching servers resident on LAN 110), content provider 302 may obtain a numerical remainder of 0, 1, or 2 from the division of the hash by the number of local caching servers for each unit of content requested by electronic device 102 and/or other electronic devices on LAN 110. Content provider 302 may then direct requests for the content to the local caching server corresponding to the numerical remainder. In other words, content provider 302 may use the hash value and numerical remainder to track the allocation of content (e.g., content 316) from CDN 104 to different local caching servers (e.g., local caching server 108) within the same LAN (e.g., LAN 110) in lieu of a more computationally expensive tracking mechanism, such as storing the allocated content in global server list 218.

In some embodiments, instead of computing the hash value from the URI of the content (or other identifying value of the content) and performing the division described above, content provider 302 can use another algorithm to assist in identifying a local caching server from among two or more local caching servers available on a LAN. For example, content provider 302 can use a round-robin selection mechanism in which local caching servers are selected in a round-robin pattern. Alternatively, content provider 302 can use a random selection, a weighted random selection, etc. Generally, any selection algorithm can be used that enables content provider 302 and/or the local caching server(s) on a LAN to effectively store content items and respond to requests for copies of content items. In these embodiments, content provider 302 can compute a selection value for the requested content (or based on the requested content, as described above) Content provider 302 can then use the selection value and information about two or more local caching servers available to an electronic device 102 to assist in identifying a particular local caching server to provide content to a requesting electronic device 102.

In addition, content provider 302 may facilitate access to cached content within LAN 110 by obtaining address information from global server list 218 and selecting an appropriate local caching server for use by electronic device 102 and/or other electronic devices in LAN 110 based on the address information. For example, during the registration process, the administrator may provide a subnet, a range of local addresses (e.g., local address 214), etc. to be served by each local caching server on LAN 110 to registration server 206. Registration server 206 may then store this information as address information for the corresponding local caching server(s). Content provider 302 may subsequently obtain a local address 318 for electronic device 102 from request 306 and match local address 318 with a particular local caching server using the address information from global server list 218. Content provider 302 may also provide the local address of the local caching server to electronic device 102 to enable electronic device 102 to obtain the requested content from the local caching server. Content provider 302 may thus expedite downloading of cached content by an electronic device by ensuring that the electronic device downloads the content from a particular local caching server (e.g., a geographically closest local caching server to electronic device 102, a fastest LAN connection between the local caching server and electronic device 102, etc.) instead of other available local caching servers.

The system of FIG. 3 may additionally include a number of mechanisms to protect content 316 from unauthorized access. First, local caching server 108 may verify the validity of a request (e.g., request 308) for content 316 from electronic device 102 by passing an authorization token from electronic device 102 to CDN 104 and enabling downloading of content 316 only if CDN 104 verifies the validity of the authorization token. Second, content provider 302 may restrict caching of certain types of content (e.g., copyrighted content) by local caching server 108 if public address 210 is detected to be in a country with legal and/or tax-based restrictions on the serving of such content, Third, content provider 302 may transmit push notifications to local caching server 108 to flush some or all of the cached content on local caching server 108 in cases where content provider 302 can determine that some or all of content 316 should be flushed from local caching server 108. For example, content provider 302 can send a push message requesting that the flush of some or all of content 316 be performed when the content is determined to be illegal and/or harmful, when public address 210 is associated with a country that does not license the sale of the content (e.g., after local caching server 108 is relocated from a first country/region to a second country/region), when content has expired/become outdated/been determined to have a bug/flaw, and/or when local caching server 108 has not been used for a pre-specified period (e.g., two months). Finally, in some embodiments, local caching server 108 itself can automatically flush some or all of the content 316 upon determining that some or all of content 316 should no longer be provided by local caching server 108. For example, local caching server 108 can flush the content when the content is determined to be illegal and/or harmful, when public address 210 is associated with a country that does not license the sale of the content, when content has expired/become outdated, and/or when local caching server 108 has not been used (e.g., been unplugged and/or not communicated with) for a pre-specified period (e.g., two months).

Content provider 302 may also include CDN 104 in response 312 to allow CDN 104 to operate as a failover for local caching server 108. For example, electronic device 102 may encounter an error associated with obtaining content 316 from local caching server 108 if local caching server is down 108 and/or an unsupported network topology (e.g., double network address translation (NAT), guest network, etc.) exists between electronic device 102 and local caching server 108. To enable timely detection of the error, request 308 may include a short (e.g., 500 ms to 1 second) timeout interval. If local caching server 108 is not reachable after the timeout interval has lapsed, electronic device 102 may obtain a URL and/or other identifier for CDN 104 from response 312 and fall back to downloading content 316 from CDN 104.

CDN 104 may further be used as a failover if content 316 is corrupted, either during transmission over Internet 106 and/or LAN 110 or as a result of disk corruption and/or failure on local caching server 108. To detect such corruption, content 316 may be verified by both electronic device 102 and local caching server 108 while content 316 is transmitted to electronic device 102 and local caching server 108 from local caching server 108 and CDN 104, respectively. For example, electronic device 102 and local caching server 108 may each calculate a first checksum (e.g., an MD5 checksum) from a block of newly downloaded content 316 and compare the first checksum with a second checksum that is passed from CDN 104 through local caching server 108 to electronic device 102. If the first and second checksums do not match, the block may be corrupted.

Because local caching server 108 may handle both downloading of content 316 from CDN 104 and transmission of the downloaded content 316 to electronic device 102, local caching server 108 may not perform verification of content 316 in real-time. Instead, electronic device 102 may verify content 316 at a faster rate and switch to downloading content 316 from CDN 104 after corrupted content 316 is found. Electronic device 102 may also transmit a notification of corruption to local caching server 108 to inform local caching server 108 of the corrupted content 316.

Upon receiving a notification of corruption from electronic device 102, local caching server 108 may expedite verification of the downloaded content 316 by, for example, prioritizing the verification over other processes and/or tasks executing on local caching server 108. If corruption of the downloaded content 316 is verified, local caching server 108 may flush the corrupted blocks of content 316 and re-download the blocks from CDN 104. If corruption of content 316 is widespread and/or extensive, local caching server 108 may flush all of content 316 and re-download content 316 from CDN 104.

Alternatively, upon detecting corruption in a block of content 316, electronic device 102 may provide the second checksum and the byte range associated with the corrupted content to local caching server 108, and local caching server 108 may compare the second checksum with a third checksum calculated from the cached content 316 on local caching server 108. If local caching server 108 also detects corruption in the cached content (e.g., if the checksums do not match), local caching server 108 may re-download content 316 from CDN 104. If local caching server 108 does not detect corruption in the cached content e.g., if the checksums match), local caching server 108 may determine that the corruption was caused during or after transmission of content 316 to electronic device 102 and re-transmit cached content associated with the byte range to electronic device 102. Finally, if electronic device 102 continues detecting corruption in the same byte range after obtaining the re-transmitted content from local caching server 108, electronic device 102 may switch to downloading content 316 from CDN 104.

Local caching server 108 may additionally include functionality to manage caching of content 316 and/or other content on limited storage space on local caching server 108. For example, local caching server 108 may allow an administrator and/or other user to allocate a percentage of the disk drive on local caching server 108 towards caching downloaded content (e.g., content 316). Local caching server 108 may also provide status and/or activity information associated with the amount (e.g., number of objects and/or bytes) of cached content provided by local caching server 108 and/or flushed from local caching server 108 because of space constraints over a pre-specified period (e.g., an hour, a day, a week, etc.). Finally, CDN 104 and/or local caching server 108 may mark certain types of content as "sticky" to prevent the content from being flushed from local caching server 108 if local caching server 108 runs out of storage space while downloading and/or caching more content from CDN 104.

By using local caching server 108 to cache and provide content (e.g., content 316) to electronic device 102 and/or other electronic devices on LAN 110, the system of FIG. 3 may reduce Internet 106 usage and/or bandwidth consumption by the electronic devices during downloading of the content from CDN 104. In turn, the system of FIG. 3 may deliver the content more quickly, efficiently, and/or cheaply to the electronic devices than if CDN 104 were used to deliver the content to the electronic devices. For example, local caching server 108 may download content 316 once, cache content 316, and transmit content 316 to multiple electronic devices on LAN 110 through a fast network connection on LAN 110, thus significantly reducing the amount of Internet 106 bandwidth and/or time required to download content 316 to the electronic devices.

Furthermore, content provider 302 may control the behavior of the electronic devices in obtaining the content. For example, content provider 302 may enable use of local caching server 108 in providing content to the electronic devices if local caching server 108 is verified and/or operating correctly. Conversely, content provider 302 may remove local caching server 108 from global server list 218 and/or omit information for local caching server 108 from response 312 if local caching server 108 is unavailable, invalid, and/or buggy. In other words, use of local caching server 108 by the electronic devices may be based on the configuration, state, and behavior of both of local caching server 108 and content provider 302.

Those skilled in the art will appreciate that the system of FIG. 3 may be implemented in a variety of ways. First, content provider 302 may be provided by one or more servers, hosts, and/or software components. For example, the functionality of the registration server and content provider 302 may be implemented by a single server and/or component, and global server list 218 may be stored on the server and/or component. Alternatively, content provider 302 may include a content source that provides content 316 and/or other content available to electronic device 102 and receives requests (e.g., request 306) for the content from electronic device 102. The content source may provide public address 210 to a selection mechanism that looks up local caching server 108 in global server list 218 based on public address 210. The content source may then provide local address 214, GUID 216, and/or other information associated with local caching server 108 to the content source. Finally, the content source may transmit a response (e.g., response 312) to the request containing both the information for locating and using local caching server 108 and information for locating and using CDN 104 to electronic device 102.

Second, local caching server 108 may be provided by a computer system, router, wireless base station, wireless access point, and/or other network-enabled device on LAN 110. Moreover, local caching server 108 may be located by electronic device 102 and/or other electronic devices on LAN 110 using a. number of techniques. For example, local caching server 108 may use a discovery protocol such as Bonjour (Bonjour™ is a registered trademark of Apple Inc.) to register with LAN 110 and advertise a local-caching service on LAN 110. Electronic devices on LAN 110 may also use the discovery protocol to discover local caching server 108, connect to local caching server 108, and obtain content from local caching server 108. Alternatively, the electronic devices may use the discovery protocol to discover local caching server 108 and/or other local caching servers on LAN 110 and query content provider 302 for the local caching server responsible for caching the type of content (e.g., books, movies, music, applications, software updates, etc.) requested by the electronic devices.

Figure 4:
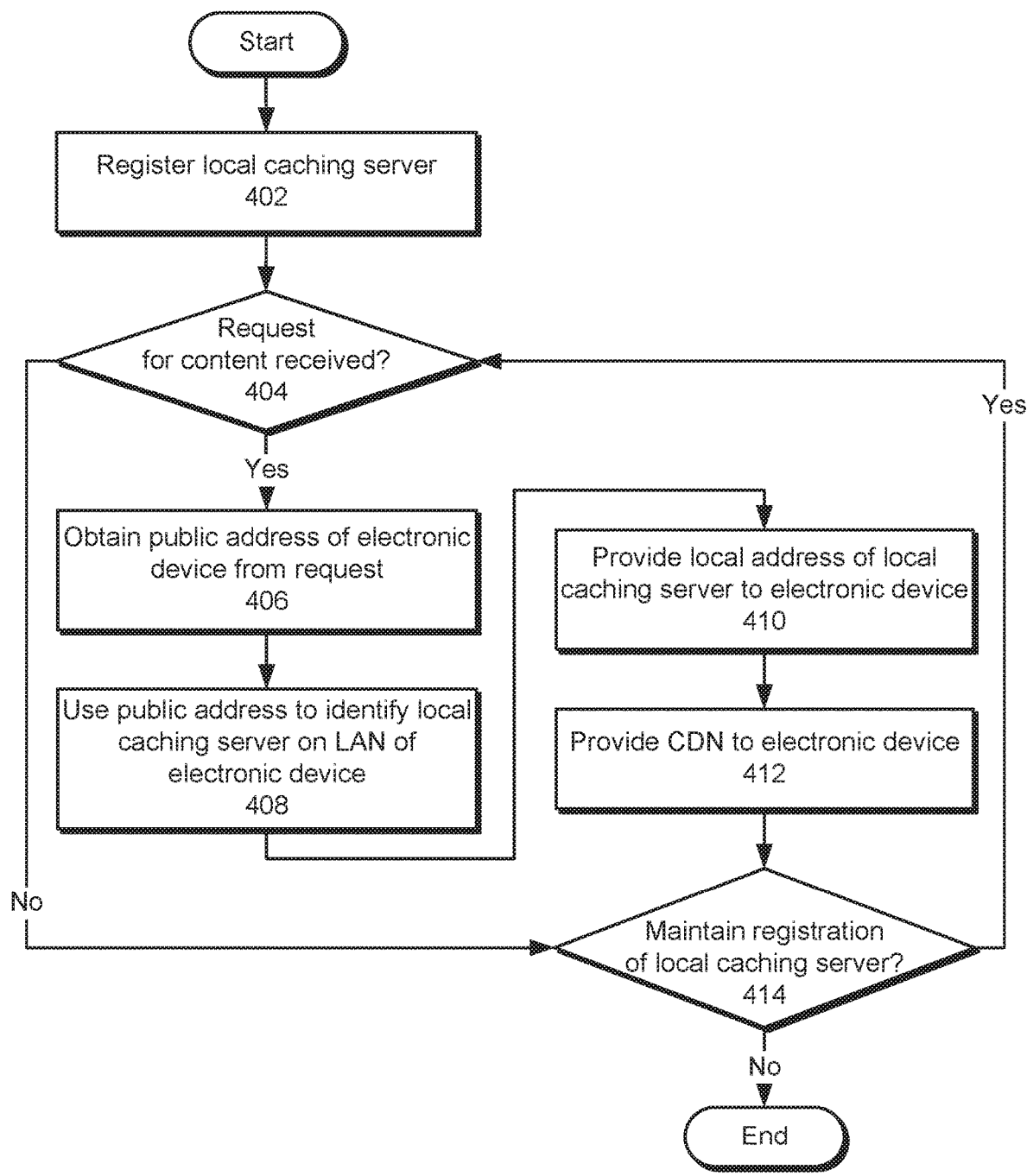
FIG. 4 shows a flowchart illustrating the process of delivering content to an electronic device in accordance with the disclosed embodiments.

FIG. 4 shows a flowchart illustrating the process of delivering content to an electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, a local caching server is registered to enable use of the local caching server (operation 402) by the electronic device. To register the local caching server, a registration server may obtain registration information for the local caching server, including a certificate for the local caching server. The registration server may then verify the registration information by, for example, validating the certificate. Once the registration information is verified, the registration server may add the local caching server to a global server list of local caching servers.

Next, a request for content may be received from the electronic device (operation 404). For example, the electronic device may request audio, video, images, books, applications, and/or software updates from the content provider. If no request for content is received, information associated with accessing the content is not provided to the electronic device. If a request for content is received, a public address of the electronic device is obtained from the request (operation 406), and the public address is used to identify the local caching server on the LAN of the electronic device (operation 408). For example, the local caching server may be identified by obtaining a public IP address of the electronic device from the request and matching the public IP address to an entry for the local caching server in the global server list. As described above, this operation can include using address information from the global server list to determine a particular one of two or more local caching servers on the same LAN as the electronic device that is to be used to acquire the requested content.

Once the local caching server is identified, the local address of the local caching server is provided to the electronic device (operation 410). For example, a local IP address and/or GUID of the local caching server on the LAN may be transmitted to the electronic device, and the electronic device may use the local IP address to obtain the content from the local caching server and the LAN without accessing a CDN outside the LAN.

The CDN may also be provided to the electronic device (operation 412). For example, a URL and/or other identifier for the CDN may be provided to the electronic device to allow the electronic device to obtain the content upon detecting an error (e.g., unavailability of the local caching server, corruption of the content, unsupported network topology, etc.)associated with obtaining the content from the local caching server. In other words, the CDN may serve as a failover for the local caching server.

Registration of the local caching server may be maintained (operation 414) independently of the handling of requests for content from the electronic device and/or other electronic devices on the LAN. For example, the local caching server may continue to be registered with the registration server as long as the local caching server transmits a periodic "heartbeat" to the registration server. If registration of the local caching server is to be maintained, requests for content from electronic devices in the same LAN as the local caching server may be processed by providing the local address of the local caching server and/or the CDN in responses to the requests (operations 404-412). Such directing of the requests for content to the local caching server may continue until the local caching server is no longer registered (i.e., is no longer listed on the global server list).

Figure 5:
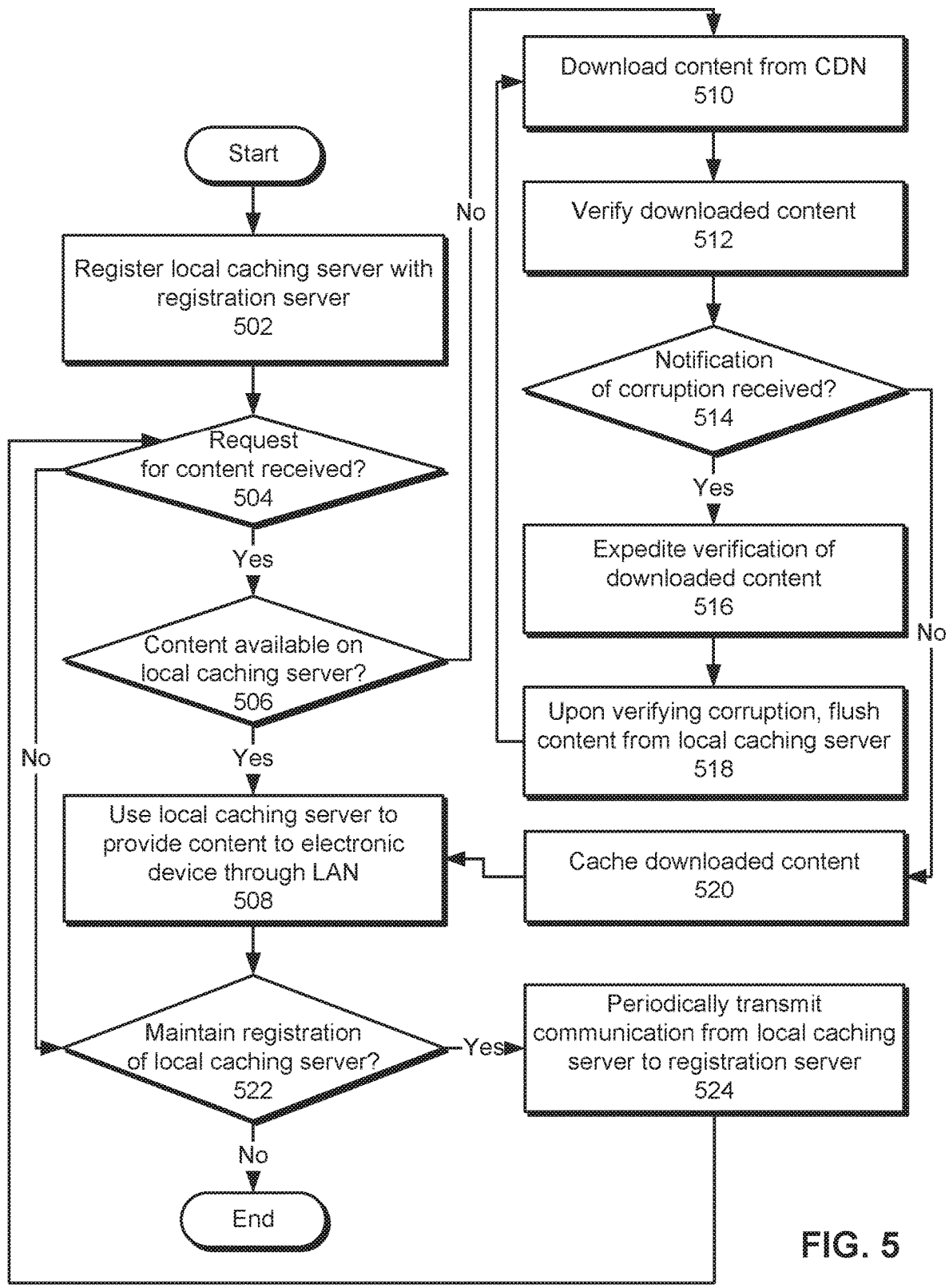
FIG. 5 shows a flowchart illustrating the process of providing content in accordance with the disclosed embodiments.

FIG. 5 shows a flowchart illustrating the process of providing content in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

First, a local caching server is registered with a registration server outside a LAN of the local caching server (operation 502). To enable registration of the local caching server, the local caching server may provide a hardware key for the local caching server to a certificate server and obtain a certificate from the certificate server. The local caching server may then provide registration information containing the certificate, a public address of the local caching server, a local address of the local caching server, LAN-specific information, and/or a GUID for the local caching server to the registration server. If the registration information is verified by the registration server, the local caching server may be added to a global server list of local caching servers, as discussed above.

In some embodiments, the LAN-specific information provided for the local caching server during the registration operation can include any information that can subsequently be used to determine whether a given local caching server is to be selected to provide particular content. This includes any information that can subsequently be used to determine whether a given local caching server from among two or more local caching servers available on the LAN is to be selected to provide the particular content. For example, in some embodiments, the LAN-specific information comprises information such as a number and/or arrangement of local caching servers on the LAN, information about the subnets/network addresses served by the local caching server, configurations of the local caching servers, hardware/software available on the local caching servers, etc. For example, a system administrator and/or a local caching server can specify one or more subnets served by a local caching server during the registration process. In some embodiments, the registration server itself can determine or infer the LAN-specific information for local caching servers based on registration information provided by two or more local caching servers (e.g., matching public addresses, etc.) and can add the LAN-specific information to the global server list.

After the local caching server is registered, the local caching server may receive a request for content (operation 504) from an electronic device on the same LAN as the local caching server. For example, the electronic device may transmit the request for content to the local caching server after requesting the content from a content provider and obtaining a local address and/or GUM of the local caching server from the content provider. If no request for content is received, content is not provided by the local caching server. If a request for content is received, the request may be handled based on the availability of the content on the local caching server (operation 506). If the content is available (e.g., cached) on the local caching server, the local caching server is used to provide the content to the electronic device through the LAN (operation 508).

If the content is not available on the local caching server, the content is downloaded from the CDN (operation 510), and the downloaded content is verified (operation 512). For example, the content may be verified by calculating a first checksum from a block of the downloaded content and comparing the first checksum with a second checksum for the block from the CDN. Because the local caching server may verify the content more slowly than the electronic device, the local caching server may receive a notification of corruption (operation 514) of the downloaded content from the electronic device before detecting the corrupted content. If a notification of corruption is not received, the downloaded content is cached (operation 520), and the local caching server is used to provide the downloaded content to the electronic device through the LAN (operation 508).

If a notification of corruption is received, verification of the downloaded content is expedited (operation 516) while the electronic device switches to downloading the content from the CDN. Once the corruption is verified, the corrupted content is flushed from the local caching server (operation 518), re-downloaded (operation 510), and re-verified (operation 512). Downloading, verification, and caching of the content may continue (operation 510-520) until the content is fully downloaded, cached, and verified to not be corrupted.

Registration of the local caching server may be maintained (operation 522) independently of handling requests for content from electronic devices on the LAN. For example, registration of the local caching server may be maintained while the local caching server is available to provide content to the electronic devices. If registration of the local caching server is to be maintained, a communication is periodically transmitted from the local caching server to the registration server (operation 524). For example, the local caching server may transmit a "heartbeat" every hour to the registration server to notify the registration server that the local caching server is available, functioning, and connected to the Internet. The local caching server may thus continue handling requests for content from the electronic devices (operation 504-520) until the local caching server is no longer configured to provide content to the electronic devices and/or registered with the registration server.

Figure 6:
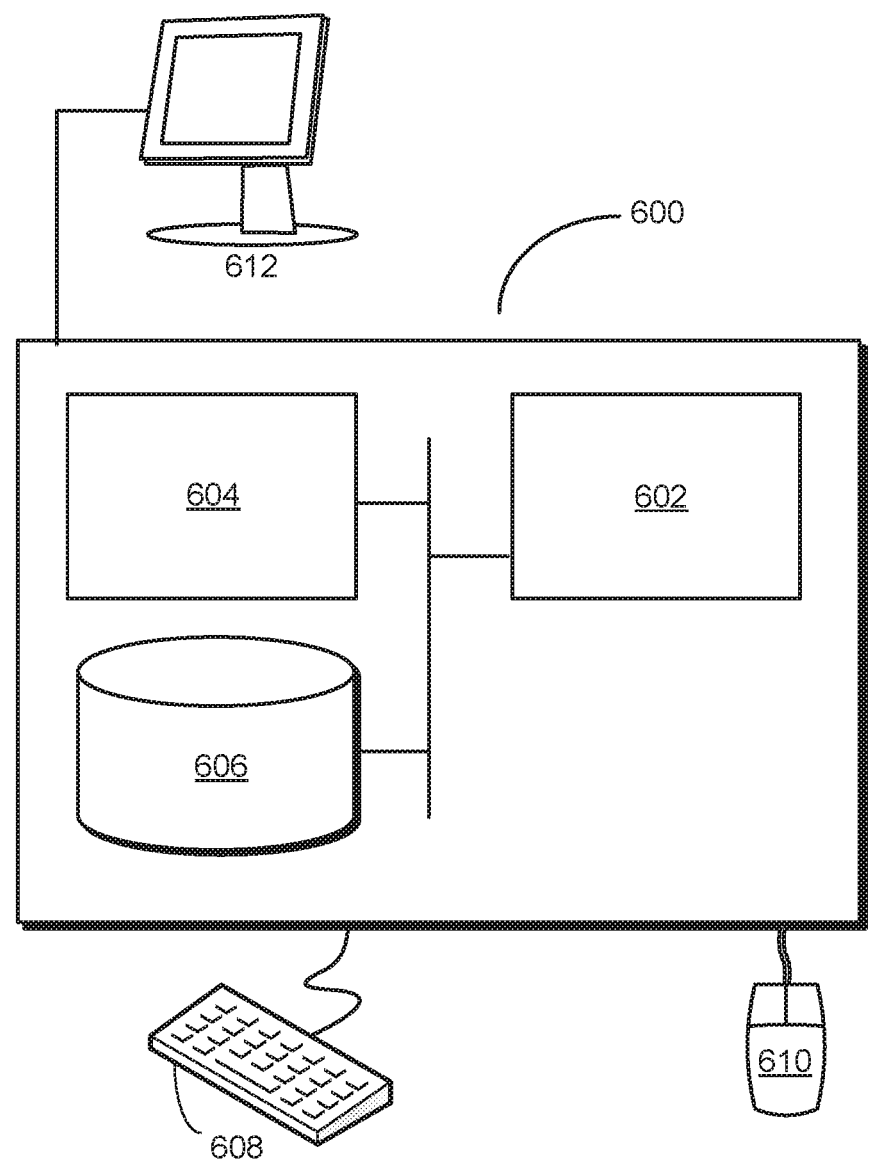
FIG. 6 shows a computer system in accordance with the disclosed embodiments.

FIG. 6 shows a computer system 600 in accordance with the disclosed embodiments. Computer system 600 may correspond to an apparatus that includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for delivering content to an electronic device. The system may include a registration server that registers a local caching server to enable use of the local caching server by the electronic device (although in some embodiments, the registration server is implemented in one or more other computer systems 600).

The system may also include a content provider that obtains a public address of the electronic device from a first request for the content from the electronic device. Next, the content provider may use the public address to identify the local caching server on a LAN of the electronic device. Finally, the content provider may provide a local address of the local caching server to the electronic device.

The electronic device may then use the local address to obtain the content from the local caching server and the LAN without accessing a content delivery network (CDN) outside the LAN.

Alternatively, computer system 600 may implement the local caching server. The local caching server may obtain a second request for the content from the electronic device (e.g., after the electronic device obtains the local address of the local caching server from the content provider). If the content is available on the local caching server, the local caching server may provide the content to the electronic device through the LAN. If the content is not available on the local caching server, the local caching server may download the content from a content delivery network (CDN) outside the LAN, cache the downloaded content, and provide the downloaded content to the electronic device through the LAN.

In addition, one or more components of computer system 600 may be remotely located and connected to the other components over a network. Portions of the present embodiments (e.g., local caching server, certificate server, registration server, content provider, etc.) may also be located on different nodes of a distributed system that implements the embodiments. For example, the present embodiments may be implemented using a cloud computing system that directs a set of remote electronic devices to download content from a set of local caching servers on LANs of the electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art Additionally, the above disclosure is not intended to limit the present invention.

What is claimed is:

1. A method for providing content from a local caching server, comprising: at the local caching server, performing operations for:
   obtaining a request for the content from an electronic device, wherein the electronic device is on a local area network (LAN) of the local caching server;
   if the content is available on the local caching server, using the local caching server to provide the content to the electronic device through the LAN; and
   if the content is not available on the local caching server, using the local caching server to:
   download the content from a content delivery network (CDN) outside the LAN;
   cache the downloaded content; and
   provide the downloaded content to the electronic device through the LAN;
   receiving, from the electronic device, an indication that at least a portion of the provided content is corrupt;
   verifying, via the local caching server, that at least the portion of a copy of the provided content that is stored in the local caching server is corrupt;
   upon verifying the corruption of at least the portion of the copy of the provided content, flushing at least the portion of the copy of the provided content from the local caching server; and
   re-downloading at least a portion of the copy of the provided content to be stored in the local caching server.

2. The method of claim 1, further comprising:
   at the local caching server, performing operations for:
   registering the local caching server with a registration server, the registering comprising providing information to the registration server including at least one of a certificate, a public address of the local caching server, the local address, a globally unique identifier (GUID) for the local caching server, and LAN-specific information for the local caching server.

3. The method of claim 1, further comprising: at the local caching server, performing operations for:
   flushing one or more items of content from the local caching server upon determining that the items of content should no longer be provided by the local caching server.

4. The method of claim 3, further comprising: at the local caching server, performing operations for:

determining that the one or more items of content should no longer be provided by the local caching server when at least one of the following is true:
the one or more items of content are determined to be one or more of illegal, harmful, expired, or outdated;
a public address of the local caching server indicates that the content cannot be provided by the local caching server; or
the local caching server has not been used within a pre-specified period of time.

5. The method of claim 1, further comprising: at the local caching server, performing operations for:
acquiring at least the portion of the provided content in an uncorrupted state.

6. A non-transitory computer-readable storage medium storing instructions that, when executed by a first electronic device with computing capabilities, cause the first electronic device to perform a method for providing content as a local caching server, the method comprising:
obtaining a request for the content from a second electronic device, wherein the second electronic device is on a local area network (LAN) of the local caching server;
if the content is available on the local caching server, using the local caching server to provide the content to the second electronic device through the LAN; and
if the content is not available on the local caching server, using the local caching server to:
download the content from a content delivery network (CDN) outside the LAN;
cache the downloaded content; and
provide the downloaded content to the second electronic device through the LAN;
receiving, from the electronic device, an indication that at least a portion of the provided content is corrupt;
verifying, via the local caching server, that at least the portion of a copy of the provided content that is stored in the local caching server is corrupt;
upon verifying the corruption of at least the portion of the copy of the provided content, flushing at least the portion of the copy of the provided content from the local caching server; and
redownloading at least a portion of the copy of the provided content to be stored in the local caching server.

7. The computer-readable storage medium of claim 6, wherein the method further comprises:
registering the local caching server with a registration server, the registering comprising providing information to the registration server including at least one of a certificate, a public address of the local caching server, the local address, a globally unique identifier (GUID) for the local caching server, and LAN-specific information for the local caching server.

8. The computer-readable storage medium of claim 6, wherein the method further comprises:
flushing one or more items of content from the local caching server upon determining that the items of content should no longer be provided by the local caching server.

9. The computer-readable storage medium of claim 8, wherein the method further comprises:
determining that the one or more items of content should no longer be provided by the local caching server when at least one of the following is true:
the one or more items of content are determined to be one or more of illegal, harmful, expired, or outdated;
a public address of the local caching server indicates that the content cannot be provided by the local caching server; or
the local caching server has not been used within a pre-specified period of time.

10. The computer-readable storage medium of claim 6, wherein the method further comprises:
receiving, from the second electronic device, an indication that at least a portion of the provided content is corrupt; and
acquiring at least the portion of the provided content in an uncorrupted state.

11. A system, comprising:
a local caching server, comprising one or more processors configured to:
obtain a request for content from an electronic device, wherein the electronic device is on a local area network (LAN) of the local caching server;
if the content is available on the local caching server, provide the content to the electronic device through the LAN; and
if the content is not available on the local caching server:
download the content from a content delivery network (CDN) outside the LAN;
cache the downloaded content; and
provide the downloaded content to the electronic device through the LAN;
receive, from the electronic device, an indication that at least a portion of the provided content is corrupt;
verify, via the local caching server, that at least the portion of a copy of the provided content that is stored in the local caching server is corrupt;
upon verifying the corruption of at least the portion of the copy of the provided content, flush at least the portion of the copy of the provided content from the local caching server; and
re-download at least a portion of the copy of the provided content to be stored in the local caching server.

12. The system of claim 11, wherein the one or more processors are configured to:
register the local caching server with a registration server, the registering comprising providing information to the registration server including at least one of a certificate, a public address of the local caching server, the local address, a globally unique identifier (GUID) for the local caching server, and LAN-specific information for the local caching server.

13. The system of claim 11, wherein the one or more processors are configured to:
flush one or more items of content from the local caching server upon determining that the items of content should no longer be provided by the local caching server.

14. The system of claim 13, wherein the one or more processors are configured to:
determine that the one or more items of content should no longer be provided by the local caching server when at least one of the following is true:
the one or more items of content are determined to be one or more of illegal, harmful, expired, or outdated;
a public address of the local caching server indicates that the content cannot be provided by the local caching server; or
the local caching server has not been used within a pre-specified period of time.

15. The system of claim 13, wherein the one or more processors are configured to:
   determine that the one or more items of content should no longer be provided by the local caching server when a public address is associated with a country that does not license the sale of the content.

16. The system of claim 13, wherein the one or more processors are configured to:
   determine that the one or more items of content should no longer be provided by the local caching server when the one or more items of content have expired, become outdated, or have been determined to have a bug or flaw.

17. The system of claim 11, wherein the one or more processors are configured to:
   acquire at least the portion of the provided content in an uncorrupted state.

* * * * *